R. A. HUMPHREY.
SHIELD FOR CULTIVATORS.
APPLICATION FILED JULY 15, 1920.

1,357,092.

Patented Oct. 26, 1920.

Inventor
R. A. Humphrey,
By G. B. McBath
Attorney

Witness:
Chas. L. Griesbauer

UNITED STATES PATENT OFFICE.

ROBERT A. HUMPHREY, OF GILTNER, NEBRASKA.

SHIELD FOR CULTIVATORS.

1,357,092.  Specification of Letters Patent.  Patented Oct. 26, 1920.

Application filed July 15, 1920. Serial No. 396,512.

*To all whom it may concern:*

Be it known that I, ROBERT A. HUMPHREY, a citizen of the United States, residing at Giltner, in the county of Hamilton and the State of Nebraska, have invented certain new and useful Improvements in Shields for Cultivators, of which the following is a specification.

This invention relates to a shield formed of a series of open end cups that travel on an endless chain above the crop being cultivated, the sides of the cups extending upon opposite sides of the plants, the bottoms of the cups traveling above the plant tops. These cups are supported by a frame attached to a straddle row cultivator, the cups working between the cultivator teeth that work the ground on opposite sides of the row.

The invention also comprises means for causing travel of the cups as the cultivator advances and for lifting the frame supporting the cups at the end of the row, at the same time that the plows or cultivators are lifted.

The device is especially adapted to be used with various forms of cultivators manufactured for cultivating corn. Most of these cultivators work two rows at a time, in which case I would attach to such a cultivator two of my devices, one for each row.

In connection with a cultivator working but one row only one would be employed, as shown in the drawings.

There are several forms of straddle row cultivators with all of which my device can be used, but it would be connected or attached to each make or type to fit the construction of the cultivator with which it was used.

As these cultivators vary in the manner of constructing their frames and in the arrangement and disposition of the cultivator teeth, and their number, I have shown only such parts of a cultivator as are essential to an understanding of the use of my invention.

Figure 1:
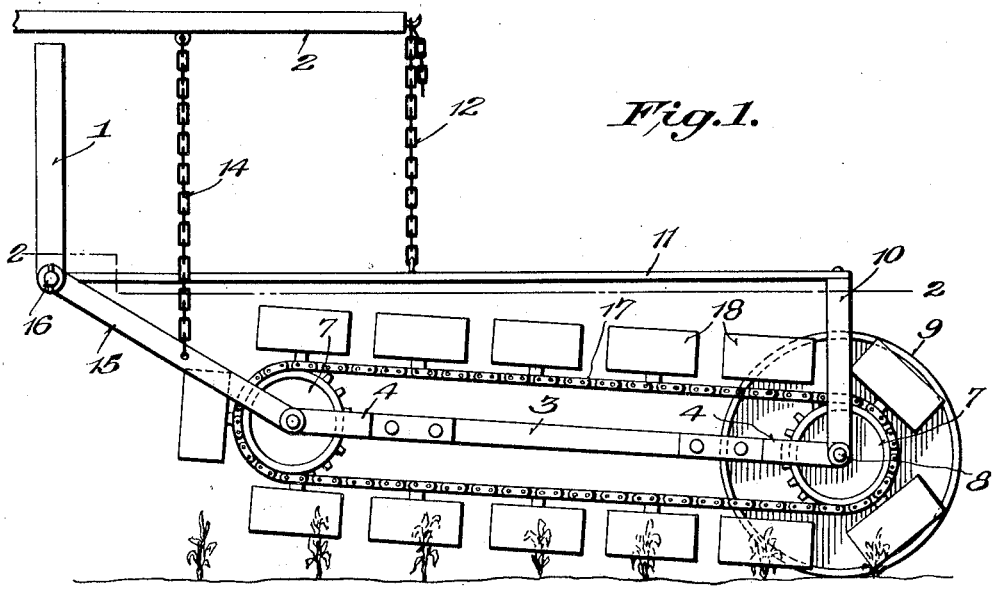
Figure 1 is a side elevation, showing a side view of an arch of the cultivator, and a portion of the lifting bar of the same, the remainder of the bar being broken away, the plows or teeth being omitted.

In the drawings 1 designates the upright arch usually found in straddle row cultivators, and 2 indicates a portion of the lifting bar common to cultivators, and by means of which the plows or teeth are lifted when the cultivator is turned at the ends of the row. These are not parts of my invention and are shown only to make clear certain connections.

In constructing my device I employ a longitudinal bar 3 with a fork 4 at each end. For adjustment purposes the fork members are formed separately and are bolted in place, and at the forward end portion the bar 3 has slots 5, with bolt openings 6 at the rear. The slots 5 allow for longitudinal adjustment of the front fork, which acts also as a chain tightener. Sprocket wheels 7 are mounted respectively in the forks 4 and on the shaft 8, at the rear I also mount drive wheels 9. These are of heavy sheet metal and travel on the ground on opposite sides of the corn or other plants being cultivated. They serve not only to support the rear end of the frame, formed by the bar 3 and forks 4, but also being rigid with shaft 8 drive the rear sprocket wheel 7.

A bracket 10 is mounted on the rear axle 8, in the form of an arch and to the upper part of the bracket is secured a forwardly extending rod 11. A chain 12 connects this rod to the lifting bar or lever 2 of the cultivator, so that the raising of said bar to lift the plows or teeth at the ends of the rows will also bar 11 and the rear portion, viz., the wheels 9 of my device. Rods 15 connect the forward end of the device with a cross bar 16 carried by the cultivator arch 1. Rods 15 are pivotally connected to the forward axle 8ª, and chains 14 connect these rods with the bar 2. By taking up or letting out chains 14 the forward end of the device can be adjusted to meet the needs of the growing crop.

A sprocket chain 17 runs over the sprocket wheels 7 and carries cups or shields 18. These cups are open at the ends and the sides are flared outwardly. In practice the chain will have three links allotted to each cup, the middle link of the three being connected to the cup, as by a rivet, and the cups are spaced apart sufficiently for them to run over the sprocket wheels without interfering with one another. The cups extend over the tops and partly over the sides of the corn, while running the under flight, and prevent dirt and trash being thrown on the small plants.

It will be noted that the lower flight, viz., the cups in operative position, will travel in the direction opposite that of the plows or teeth working on opposite sides of them.

These teeth, or plows, will tend to throw dirt or trash inwardly and forwardly, the outwardly flaring cups, or shield will tend to carry it rearwardly and will shed it in small windrows on opposite sides of the corn, where otherwise it would be thrown between the stalks, in some cases on them, and in subsequent cultivations would be caught by a cultivator tooth and dragged forwardly, catching and breaking some of the small plants in its travel. The device shown and described spreads the dirt evenly along the rows, prevents the small plants from being covered, and prevents trash, such as pieces of old stalks, etc., from being thrown transversely across the row and between the young plants; instead they are distributed longitudinally along the rows and to one side and gradually during the season of cultivation covered with earth. They are therefore not only thrown into a position where they will be out of the way of subsequent cultivations, but by their gradual decay they will add humus and moisture to the growing crop.

Figure 2:
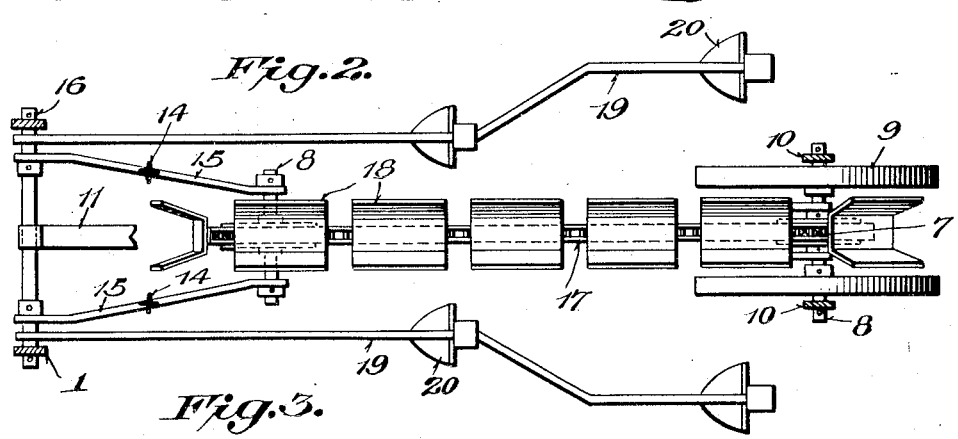
Fig. 2 is a plan view of my device, the cultivator arch being in section.
Figure 3:
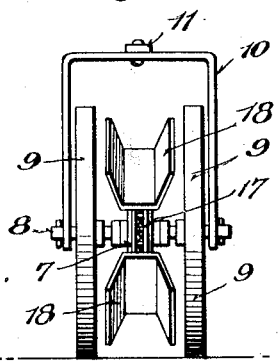
Fig. 3 is an end view of my device, unattached.
Figure 4:
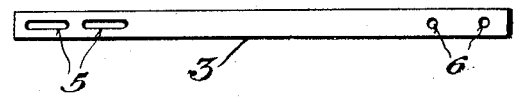
Fig. 4 is a side view of a center bar.

I do not believe that I should be limited to any particular method of connecting the device to a cultivator, as this would depend on the type of frame employed by said cultivator, and for convenience I have shown only portions of the cultivator. In Fig. 2 I have shown the bars 19 carrying the cultivator teeth 20, in order that the relation between said teeth and the cups of my device may be made clear. These bars and teeth however are arranged differently on various cultivators, some having three or more teeth on each side of the row.

What I claim is:

1. The combination with a cultivator, of an endless chain, and a series of cup-like shields carried by said chain, the lower flight extending above and partially inclosing the plants, and means for driving said chain.

2. The combination with a cultivator adapted to straddle a row, of an endless chain mounted above and between the teeth of the cultivator, a series of cup-like shields carried by the chain, and means for moving said chain so that the lower flight moves in a direction opposite that of the travel of the cultivator.

3. The combination with a cultivator, a wheel-supported frame, said wheel being mounted at the rear end of the frame and acting as a tractor, means for adjustably suspending the front of the frame from the cultivator, an endless chain carried by the frame, plant shields on the chain, and means for lifting said frame at the end of a row.

In testimony whereof I affix my signature.

ROBERT A. HUMPHREY.